(12) United States Patent
Nadler

(10) Patent No.: US 10,269,134 B2
(45) Date of Patent: Apr. 23, 2019

(54) METHOD AND SYSTEM FOR DETERMINING A REGION OF INTEREST OF A USER IN A VIRTUAL ENVIRONMENT

(71) Applicant: Hashplay Inc., San Francisco, CA (US)

(72) Inventor: Ingo Nadler, Bad Breisig (DE)

(73) Assignee: HASHPLAY INC., San Francisco, CA (US)

( * ) Notice: Subject to any disclaimer, the term of this patent is extended or adjusted under 35 U.S.C. 154(b) by 167 days.

(21) Appl. No.: 15/638,774

(22) Filed: Jun. 30, 2017

(65) Prior Publication Data

US 2018/0130223 A1     May 10, 2018

Related U.S. Application Data

(60) Provisional application No. 62/357,421, filed on Jul. 1, 2016.

(51) Int. Cl.
| | |
|---|---|
| *G06K 9/00* | (2006.01) |
| *G06T 7/70* | (2017.01) |
| *G06T 11/00* | (2006.01) |
| *G06T 11/60* | (2006.01) |
| *H04N 13/117* | (2018.01) |
| *H04N 13/15* | (2018.01) |
| *G06Q 30/02* | (2012.01) |
| *H04N 13/204* | (2018.01) |
| *H04N 13/344* | (2018.01) |

(52) U.S. Cl.
CPC .............. *G06T 7/70* (2017.01); *G06T 11/001* (2013.01); *G06T 11/60* (2013.01); *H04N 13/117* (2018.05); *H04N 13/15* (2018.05); *G06Q 30/0201* (2013.01); *G06T 2207/10024* (2013.01); *G06T 2207/10028* (2013.01); *H04N 13/204* (2018.05); *H04N 13/344* (2018.05)

(58) Field of Classification Search
CPC ... G06Q 30/0201; G06T 11/001; G06T 11/60; G06T 2207/10024; G06T 2207/10028; G06T 15/04; G06T 15/005; G06T 19/006
USPC ..... 382/103; 705/14.41, 7.15, 7.29; 345/419
See application file for complete search history.

(56) References Cited

U.S. PATENT DOCUMENTS

| | | | |
|---|---|---|---|
| 8,433,612 B1* | 4/2013 | Sharma ............... | G06Q 30/06 705/14.41 |
| 2015/0091891 A1* | 4/2015 | Raheman ............. | A63G 31/16 345/419 |
| 2016/0234475 A1* | 8/2016 | Courchesne ......... | H04N 7/157 |

* cited by examiner

*Primary Examiner* — Charlotte M Baker
(74) *Attorney, Agent, or Firm* — Ziegler IP Law Group, LLC

(57) ABSTRACT

A method of determining a region of interest of a user in a virtual environment. The method includes providing at least one first image associated with the virtual environment on a virtual pattern and mapping an RGB texture including an alpha channel on the virtual pattern, wherein the RGB texture comprises a plurality of color channels. Furthermore, the method includes modifying color values of one or more pixels of a first color channel along a change in viewing direction of the user, and of one or more pixels of a second color channel based on a gaze duration along the change in viewing direction of the user. Moreover, the method includes generating an at least one second image based on the modified alpha value of the one or more pixels of the second color channel for determining the region of interest of the user in the virtual environment.

19 Claims, 3 Drawing Sheets

METHOD AND SYSTEM FOR DETERMINING A REGION OF INTEREST OF A USER IN A VIRTUAL ENVIRONMENT

TECHNICAL FIELD

The present disclosure relates generally to market research; and more specifically, to methods of determining regions of interest of users in virtual environments. Furthermore, the present disclosure relates to systems for determining regions of interest of users in virtual environments, for example using aforementioned methods. Furthermore, the present disclosure is concerned with computer program products comprising a non-transitory computer-readable storage medium having computer-readable instructions stored thereon, the computer-readable instructions being executable by a computerized device comprising processing hardware to execute aforesaid methods.

BACKGROUND

The marketing and sales of consumer products are contemporarily highly competitive. In order to remain ahead in such competition, manufacturers and retailers invest enormously in researching around marketing and sales aspects of their consumer products. Typically, such research is an attempt to understand what influences a given customer's purchasing decision. For example, the research may include studying locations of products in a store, where they are displayed or advertised. Moreover, such research may include gathering information about a given customer's activities, like customer movement within the store, interest shown by the given customer in any particular product, amount of time spent viewing specific products, successful purchase of products and so forth.

However, such conventional marketing research encounters various difficulties. Firstly, such marketing research is performed manually, and therefore, such techniques may involve time-consuming processes. Generally, such techniques involve one or more persons (such as one or more store employees) to record the movements of customers within an environment (such as a mall, a departmental store and so forth). Furthermore, the one or more store employees may record the movements of customers within the facility on a paper sheet representing its layout. Thereafter, the accumulated data would be reviewed to determine the region of interest or products that the customer liked within the environment. Additionally, in this technique, an environment may have a finite number of employees for recording the customer movement. Therefore, the customer movements may be recorded only in specific locations. Moreover, the aforesaid technique is labor-intensive and is generally prone to inaccuracies. Furthermore, conventional market research employs surveys and shopping diaries that require customers to record manually their travel patterns, identifying the stores they visited and time spent by them within the stores. Thus, such techniques do not provide privacy for the customer and usually, interferes with the customer's experience within the environment. Therefore, it will be appreciated that such techniques are ineffective, are associated with inaccuracies and are not customer-friendly.

Therefore, in light of the foregoing discussion, there exists a need to overcome the aforementioned drawbacks associated with conventional market research techniques to determine customer interest.

SUMMARY

The present disclosure seeks to provide a method of determining a region of interest of a user in a virtual environment. The present disclosure also seeks to provide a system for determining a region of interest of a user in a virtual environment. The present disclosure seeks to provide an at least partial solution to the existing problems associated with the conventional market research techniques to determine customer interest. An aim of the present disclosure is to provide a solution that at least partially overcomes the problems encountered in the prior art, and provides an easy-to-implement, economical and user-friendly system and method for determining a region of interest of a user in a virtual environment.

In a first aspect, an embodiment of the present disclosure provides a method of determining a region of interest of a user in a virtual environment, the method comprising:
(i) providing at least one first image associated with the virtual environment on a virtual pattern;
(ii) mapping an RGB texture comprising an alpha channel on the virtual pattern; wherein the RGB texture comprises a plurality of color channels;
(iii) modifying a color value of one or more pixels of a first color channel of the plurality of color channels along a change in viewing direction of the user;
(iv) modifying an alpha value of one or more pixels of a second color channel of the plurality of color channels based on a gaze duration along the change in viewing direction of the user; and
(v) generating an at least one second image based on the modified alpha value of the one or more pixels of the second color channel for determining the region of interest of the user in the virtual environment.

In a second aspect, an embodiment of the present disclosure provides a system for determining a region of interest of a user in a virtual environment, the system comprising:
a head mounted device to provide at least one first image associated with the virtual environment on a virtual pattern;
a computing device communicably coupled to head mounted device; wherein the computing device is operable to:
map an RGB texture comprising an alpha channel on the virtual pattern, wherein the RGB texture comprises a plurality of color channels;
modify a color value of one or more pixels of a first color channel of the plurality of color channels along a change in viewing direction of the user; and
modify an alpha value of one or more pixels of a second color channel of the plurality of color channels based on a gaze duration along the change in viewing direction of the user;
and
a server arrangement communicably coupled to the computing device, wherein the server arrangement is operable to generate an at least one second image based on the modified alpha value of the one or more pixels of the second color channel for determining the region of interest of the user in the virtual environment.

According to a third aspect, there is provided a computer program product comprising a non-transitory computer-readable storage medium having computer-readable instructions stored thereon, the computer-readable instructions being executable by a computerized device comprising processing hardware to execute a method of determining a region of interest of a user in a virtual environment.

Embodiments of the present disclosure substantially eliminate or at least partially address the aforementioned problems in the prior art, and enables to determine a region of interest of a user in a virtual environment.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

Figure 1:
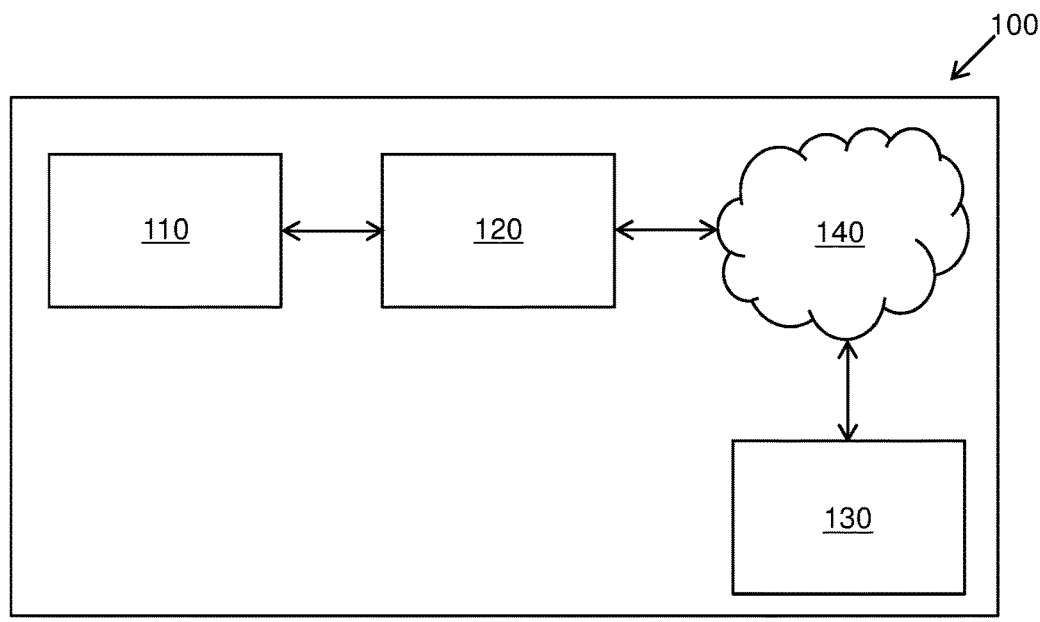
FIG. 1 is a block diagram of a system for determining a region of interest of a user in a virtual environment, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

Glossary

Brief definitions of terms used throughout the present disclosure are given below.

The term "virtual environment" relates to a virtual surrounding that a given user is required to be present within. Such a virtual environment may be a representation of a real environment, such as, a real environment that is at a different location from a current location of the user. Alternatively, the real environment may be same as the current location of the user. Optionally, such a virtual environment may be an imaginary environment that is designed for providing a user with an immersive experience of virtual reality.

In an example, the virtual environment is associated with a retail establishment, such as a shopping mall or a department store. However, it will be appreciated that the term "virtual environment" may refer to any other environment that is at a same or different location from the user. In one example, the virtual environment is associated with a library or with a banqueting hall.

In another example, the virtual environment is associated with an imaginary environment such as a computer generated model of an upcoming retail establishment. In such an instance, the virtual environment may be rendered by presenting two distinct perspectives of a surrounding (such as left and right perspective views of the surrounding) to the user, by employing a technique such as stereoscopy, to provide a perception of stereoscopic depth within the environment. Furthermore, the user can change their viewing direction, for example, to change a direction of travel within the virtual environment, the user can interact with an object presented within the virtual environment and so forth.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed therebetween, while not sharing any physical connection with one another. Based upon the present disclosure provided herein, one of ordinary skill in the art will appreciate a variety of ways in which connection or coupling exists in accordance with the aforementioned definition.

The terms "first", "second", and the like, herein do not denote any order, quantity, or importance, but rather are used to distinguish one element from another. Furthermore, the terms "a" and "an" herein do not denote a limitation of quantity, but rather denote the presence of at least one of the referenced item.

The phrases "in an embodiment", "according to an embodiment" and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

Embodiments of the Present Disclosure

In a first aspect, an embodiment of the present disclosure provides a method of determining a region of interest of a user in a virtual environment, the method comprising:

(i) providing at least one first image associated with the virtual environment on a virtual pattern;

(ii) mapping an RGB texture comprising an alpha channel on the virtual pattern, wherein the RGB texture comprises a plurality of color channels;

(iii) modifying a color value of one or more pixels of a first color channel of the plurality of color channels along a change in viewing direction of the user;

(iv) modifying an alpha value of one or more pixels of a second color channel of the plurality of color channels based on a gaze duration along the change in viewing direction of the user; and (v) generating an at least one second image based on the modified alpha value of the one or more pixels of the second color channel for determining the region of interest of the user in the virtual environment.

In a second aspect, an embodiment of the present disclosure provides a system for determining a region of interest of a user in a virtual environment, the system comprising:
  a head mounted device to provide at least one first image associated with the virtual environment on a virtual pattern;
  a computing device communicably coupled to head mounted device; wherein the computing device is operable to:
    map an RGB texture comprising an alpha channel on the virtual pattern, wherein the RGB texture comprises a plurality of color channels;
    modify a color value of one or more pixels of a first color channel of the plurality of color channels along a change in viewing direction of the user; and
    modify an alpha value of one or more pixels of a second color channel of the plurality of color channels based on a gaze duration along the change in viewing direction of the user;
and
  a server arrangement communicably coupled to the computing device, wherein the server arrangement is operable to generate an at least one second image based on the modified alpha value of the one or more pixels of the second color channel for determining the region of interest of the user in the virtual environment.

The system comprises a head mounted device to provide at least one first image associated with the virtual environment on a virtual pattern. For example, the head mounted device is worn by the user and the at least one first image associated with the virtual environment is provided to the user using the head mounted device. In one example, the head mounted device includes at least one of virtual reality headsets, virtual reality goggles and virtual reality glasses. In such an instance, the head mounted device is operable to render the at least one first image, for example on one or more displays associated therewith.

In an example, the at least one first image comprises a three-dimensional view of the virtual environment. For example, the virtual environment is associated with a three-dimensional view within a retail establishment, such as a departmental store. In such an instance, the at least one first image of the departmental store enables the user to view different visual perspectives within the departmental store. Furthermore, the at least one first image may comprise one or more items associated with departmental stores, such as consumer goods that are available for sale, advertising, signboards and so forth.

In one embodiment, the at least one first image is at least one of a still image and/or a video frame of a video associated with the virtual environment. For example, the at least one first image is captured using a camera arrangement that comprises a digital camera and/or a stereoscopic camera. It will be appreciated that the digital camera enables a user thereof to capture one or more images. In such an instance, the digital camera is used to capture still images associated with various visual perspectives of the virtual environment. Furthermore, the various still images are combined to generate a three-dimensional image of the virtual environment. In one example, the camera arrangement comprises a stereoscopic camera that is used to capture a video associated with the virtual environment. It will be appreciated that the stereoscopic camera captures videos associated with a visual perspective of the virtual environment that are slightly offset from each other. Furthermore, providing such videos to the user on the head mounted device, for example, on a left and right display thereof, will enable a user to perceive a stereoscopic depth associated with the virtual environment. Moreover, such videos may enable to provide the user with an experience of movement within the virtual environment. For example, a video comprises various video frames associated with visual perspectives along a movement path through the virtual environment. In such an instance, the at least one first image is a video frame of the video associated with the virtual environment.

Furthermore, the at least one first image is provided on a virtual pattern. For example, the virtual pattern is a three-dimensional virtual sphere that serves as a background layer that the at least one first image is mapped thereto. In another example, the virtual pattern comprises a cube map that the at least one first image is mapped thereto. In an embodiment, the virtual pattern comprises a plurality of regions. For example, the virtual pattern is formed of square regions, hexagonal regions, rectangular regions and so forth. The virtual pattern is made invisible to the user wearing the head mounted device. However, the at least one first image mapped to the virtual pattern is made visible to the user. In one example, a point of reference associated with the user is positioned at center of the virtual pattern. It will be appreciated that such mapping of the at least one first image to the virtual pattern and moreover, positioning of the point of reference associated with the user at the center thereof enables to provide a visual perspective associated with any viewing direction of the user within the environment (such as to a front, left, down, up, back and so forth).

The system comprises a computing device communicably coupled to head mounted device. In an example, the computing device comprises a portable device such as a smartphone, a wearable device, a tablet computer, a laptop computer and so forth. In one embodiment, the computing device is communicably coupled to the head mounted device using at least one of a wired connection and/or a wireless connection. For example, the wired connection employs at least one cable for communicably coupling the at least one computing device to the head mounted device. According to an embodiment, the wired connection is further employed to deliver electrical power to the head mounted device. In another embodiment, the wireless connection employs at least one of Bluetooth®, infrared, ZigBee®, Wi-Fi and/or Internet®. In an example, presentation of the at least one first image is performed on the computing device and subsequently, displayed to the user using one or more displays associated with the head mounted device. In such an instance, the head mounted device may not be required to comprise components such as a memory for storing the at least one first image, a processor for retrieving information associated with the at least one first image and so forth. It will be appreciated that such head mounted device will be associated with reduced complexity and additionally, will have reduced weight as compared to conventional head mounted devices, thereby enabling a more comfortable experience for the user.

The computing device is operable to map an RGB texture comprising an alpha channel on the virtual pattern, wherein the RGB texture comprises a plurality of color channels. For example, the RGB texture is an image that is mapped on the virtual pattern along the at least one first image. In another example, the RGB texture is associated with one or more frames of a video that are mapped on the virtual pattern along the at least one image (such as, when the at least one image is a video frame associated with the virtual environment). However, in such an instance, the computing device is operable make the RGB texture invisible to the user. For example, the RGB texture is rendered on a layer that is behind a layer that is used to render the at least one first image. Furthermore, the RGB texture comprises a plurality of color channels. For example, the RGB texture comprises color channels associated with colors red, green and blue. However, it will be appreciated that the RGB texture may comprise many more color channels based on bits per pixel (or depth of color) employed in one or more displays associated with the head mounted device. In one example, the one or more displays associated with the head mounted device is a true color display and the RGB texture employs 24 bits per pixel. In such instance, the RGB texture comprises over 16.7 million color channels.

The RGB texture comprises an alpha channel. For example, the alpha channel is associated with alpha values of one or more pixels rendered on the head mounted device. In such an instance, the alpha values are indicative of transparency (or opacity) of the plurality of color channels rendered on the one or more pixels. According to an embodiment, the alpha value of one or more pixels of the alpha channel lies in a range of 0-255, with alpha value of 0 being associated with maximum transparency and alpha value of 255 being associated with maximum opacity. In one example, the alpha values associated with the plurality of color channels of the RGB texture is 0. In such instance, the RGB texture mapped on the virtual pattern in front of the at least one first image, will be invisible to the user.

The computing device is operable to modify a color value of one or more pixels of a first color channel of the plurality of color channels along a change in viewing direction of the user. For example, the at least one first image is associated with a virtual environment of a departmental store that comprises a plurality of items placed on shelves. In such an instance, the user may change their viewing direction to look at one or more of the plurality of items within the virtual environment. In one example, the first color channel of the plurality of color channels is associated with the color red. In such an instance, the computing device is operable to generate a path of the red color channel on the RGB texture. For example, the color value of pixels associated with the color red, along the change in viewing direction of the user, is increased. In an example, the color values of pixels are modified by using a circular pattern (such as a brush stroke).

In such an instance, the circular pattern is used to generate the path of the first color channel associated with the change in viewing direction of the user.

In one embodiment, the head mounted device comprises a sensor arrangement for sensing the change in viewing direction of the user. According to one embodiment, the sensor arrangement comprises at least one of an accelerometer, and/or a gyroscope. For example, the sensor arrangement enables the head mounted device to measure movement of head of the user. Such measurement of movement of head of the user enables the head mounted device to sense the change in viewing direction of the user. Consequently, a visual perspective of the environment that is provided to the user on the head mounted device is modified according to the movement of the head of the user. Furthermore, the color value of one or more pixels of the first color channel is modified based on such measured movement of head of the user.

According to an embodiment, the change in viewing direction of the user comprises at least one of a linear movement and/or a rotational movement. For example, the user moves their head linearly towards left of a current viewing direction thereof. In such an instance, view of the virtual environment is shifted to the left such that the visual perspective that is presented to the user corresponds to the viewing direction of the user after the movement of the head. In another example, the user rotates their head upwards of the current viewing direction thereof. In such an instance, the visual perspective of the virtual environment that is presented to the user is shifted to correspond to the rotational movement of the head of the user.

The head mounted device further comprises a transmitter that is operable to transmit the sensed change in viewing direction of the user to the computing device. For example, the transmitter is operable to transmit the sensed change in viewing direction of the user to the computing device using the at least one cable that is used for communicably coupling the at least one computing device to the head mounted device. In another example, the transmitter is operable to transmit the sensed change in viewing direction of the user to the computing device wirelessly, such as, using one of, but not limited to, Bluetooth®, infrared, ZigBee®, Wi-Fi and/or Internet®. Furthermore, the head mounted device may comprise one or more displays for rendering the at least one image associated with the virtual environment. In one embodiment, the at least one display is a display of the computing device (such as a smartphone). In such an instance, the computing device is operable to be physically coupled to the head mounted device to enable the display thereof to serve as the display of the head mounted device. Moreover, the head mounted device may comprise one or more lens positioned on an optical path between the one or more displays and eyes of the user to enable magnification of the at least one image rendered on the one or more displays. It will be appreciated that such magnification of the at least one image enables the user to perceive stereoscopic depth associated with various items presented in the virtual environment.

The computing device is operable to modify an alpha value of one or more pixels of a second color channel of the plurality of color channels based on a gaze duration along the change in viewing direction of the user. For example, the user changes their viewing direction to look at an item (such as a consumer product) within a virtual environment of a departmental store. Furthermore, the user may be interested in the item more than other items within the departmental store and consequently, the user may look at the item longer than they may have looked at the other items. In such an instance, the alpha value of one or more pixels of a second color channel of the RGB texture, such as a color channel associated with the color green, is modified corresponding to the viewing direction of the user on the item. For example, when the gaze duration of the user on the item corresponds to 1.5 seconds, alpha value of one or more pixels of the green color channel of the RGB texture, corresponding to the viewing direction of the user along the item, is increased to 125. In such an instance, when the gaze duration of the user on the item increases to 3 seconds, alpha value of the one or more pixels of the green color channel is increased from 125 to 250. In an example, the alpha value of the one or more pixels is modified using a circular pattern (such as a brush) having higher pixel density towards the center of the circular pattern as compared to a periphery thereof.

In one embodiment, the modified color value of the one or more pixels of the first color channel is indicative of change of region of interest of the user in the virtual environment and the modified alpha value of the one or more pixels of the second color channel is indicative of an amount of interest of the user in the region of the virtual environment. For example, the color value of the one or more pixels of the first color channel is modified based on the change of viewing direction of the user. Such change of viewing direction may relate to the user looking away from an item and towards another item within the virtual environment. In such an instance, the change in viewing direction of the user is associated with change of region of interest of the user within the virtual environment. Furthermore, the modified color value of the one or more pixels of the first color channel may be employed to generate a gaze-graph associated with the user within the virtual environment.

Moreover, the alpha value of the one or more pixels of the second color channel is modified based on the gaze duration along the change in viewing direction of the user. For example, the user may change their viewing direction to look away from a first item and focus on a second item within the virtual environment. In such an instance, the user may have looked on the first item for a first duration and subsequently, the user may look at the second item for a second duration. It will be appreciated that in an instance when the second duration is longer than the first duration, the user will be more interested in the second item as compared to the first item. Consequently, the alpha value of one or more pixels of the second color channel associated with the second item is modified. Therefore, the modified alpha value of the one or more pixels of the second color channel is indicative of an amount of interest of the user in the region of the virtual environment.

In one embodiment, the computing device is further operable to modify an alpha value of one or more pixels of a third color channel of the plurality of color channels based on the gaze duration along the change in viewing direction of the user. For example, the third color channel is associated with the color blue. In such an instance, the computing device is operable to modify the alpha value of one or more pixels of the blue color channel based on the gaze duration of the user. In one example, a circular pattern having of a different diameter, or a pattern having a different shape (such as a square brush), is used to modify the pixels of the third color channel. Furthermore, such one or more pixels of the third color channel having modified alpha values may be superimposed on the one or more pixels of the second color channel having modified alpha values associated therewith, to enable one or more persons (such as market research professionals) to easily perceive information associated with the gaze duration along the change in viewing direction of the user (such as a consumer).

According to an embodiment, the at least one first image comprises an alpha channel. In such an instance, the computing device is operable to modify an alpha value of one or more pixels of the at least one first image based on the gaze duration along the change in viewing direction of the user. For example, the user fixes their focus at an item, to look at a logo associated with a packaging of the item. In such an instance, alpha values of pixels associated with the logo are modified (such as, increased) based on the gaze duration of the user, for example, from 75 to 125 in 1 second.

The system comprises a server arrangement communicably coupled to the computing device, wherein the server arrangement is operable to generate an at least one second image based on the modified alpha value of the one or more pixels of the second color channel for determining the region of interest of the user in the virtual environment. For example, the server arrangement is communicably coupled to the computing device using a network, such as, Internet or a radio network. In an embodiment, the server arrangement is hardware, software, firmware, or a combination of these that is operable to generate the at least one second image. For example, the server arrangement comprises software that is operable to employ the modified alpha values of the one or more pixels of the second color channel to generate the at least one second image. In one embodiment, the server arrangement is operable to employ the one or more pixels of the second color channel associated with various users to generate the at least one second image. For example, the various users are associated with a focus group that comprises 100 users that are classified within different demographics (such as age, location, gender and so forth). In such an instance, the server arrangement is operable to employ the one or more pixels of the second color channel associated with all the users to generate the at least one second image. Alternatively, the server arrangement is operable to employ the one or more pixels of the second color channel associated with a specific set of users (such as, based on age, location, gender and so forth) to generate the at least one second image.

According to an embodiment, the at least one second image comprises color gradients indicative of amount of interest of the user in the region of the virtual environment. For example, the color gradients range from the color green to the color red. In such an instance, the color gradients of green are associated with alpha values in proximity of 0 and the color gradients of red are associated with alpha value in proximity of 255. Consequently, alpha values between 0 and 255 are associated with different gradients in a color spectrum between green and red. Furthermore, based on the alpha value of the one or more pixels of the second color channel of the RGB texture, different color gradients are generated in the at least one second image. Moreover, the color gradients are generated along the change in viewing direction of the user. For example, an at least one first image associated with a virtual environment has various items positioned on shelves. Furthermore, when a user has looked at a first and a second item for longer durations, color gradients on the at least one second image associated with positions of the first and second items on the at least one first image will be associated with specific gradients of red based on gaze duration of the user. Furthermore, a change of viewing direction of the user between the first and second items will be associated with gradients of green as the path between the first and second items will be associated with shorter gaze durations of the user.

In an embodiment, the at least one second image comprises a heat map associated with the user within the virtual environment. For example, such heat map is employed by a person, such as a market research professional, to determine regions of interest associated with various users within a virtual environment. Such virtual environment may be associated with a real environment (such as a departmental store) or an imaginary environment (such as an upcoming mall) and may enable the market research professional to perform at least one of: determine effectiveness of marketing and/or advertising campaigns, perform brand valuation, perform shopper path-to-purchase studies, determine optimal product placement, evaluate point-of-purchase (POP) material and/or signage, perform store planning, perform space optimization within an environment (such as a store), perform category management-related research, perform consumer profiling, and so forth.

In one embodiment, the server arrangement comprises a database. For example, the database is operable to store information comprising description files associated with various virtual environments. Such information may be associated with at least one of an image, a video, an audio and so forth. Furthermore, the computing device that is communicably coupled to the server arrangement is operable to receive a description file from the database and render the virtual environment on a display associated therewith. In one embodiment, the information is associated with coordinates of various regions of the virtual environment, such as minimum and maximum latitude and longitude coordinates of various rectangular regions that comprise the virtual environment (such as, rectangular region that are rendered as frame in an instant of time on one or more displays associated with the head mounted device).

According to an embodiment, the region of interest of the user in the virtual environment comprises at least one object that enables the user to interact with the virtual environment. For example, the at least one object is associated with a hotspot that enables the user to navigate within the virtual environment. In one example, the hotspot comprises a rectangular region of the various rectangular regions of the virtual environment. In such an instance, the rectangular region is operable to be changed (such as highlighted) when the viewing direction of the user corresponds to the rectangular region. Alternatively, three-dimensional graphics, such as arrows, menus and so forth are displayed as hotspots on a region of the virtual environment. Furthermore, the user selects the hotspot by focusing thereon for a specific duration (such as 2 seconds). Consequently, an interaction with the virtual environment is performed, for example, the interaction comprises playback of a video, a stereoscopic video and/or an audio file associated with the virtual environment, playback of a video on a virtual display within the virtual environment, modification of a visual perspective of the user such that the user is navigated to another virtual environment, and so forth. In one example, the interaction comprises playback of a video on a virtual turntable that is operable to be rotated at different speeds for each of left and right visual perspectives of the user associated with the virtual environment. In such an instance, playback of the video at different speeds enables to create a delay between appearances of a visual perspective of the virtual environment on each eye of the user, thereby enabling a stereoscopic view of the virtual environment to be presented to the user.

The present description also relates to the method as described above. The various embodiments and variants disclosed above apply mutatis mutandis to the method.

Moreover, disclosed is a computer program product comprising a non-transitory computer-readable storage medium having computer-readable instructions stored thereon, the computer-readable instructions being executable by a computerized device comprising processing hardware to execute a method of determining a region of interest of a user in a virtual environment.

The present disclosure provides the method and system for determining a region of interest of a user in a virtual environment. The method comprises providing the at least one first image associated with the virtual environment on a virtual pattern. The at least one first image associated with the virtual environment that is provided on the virtual pattern enables the user to perceive the visual perspective of the virtual environment associated with any viewing direction thereof (such as, front, left, down, up, back and so forth). Furthermore, providing the virtual environment on the virtual pattern reduces a time needed to render the virtual environment when the user changes the viewing direction thereof, thereby allowing faster frame rates to be provided to the user (for example, when the virtual environment is associated with a video). Furthermore, modifying the alpha color of one or more pixels of the first color channel along the change in viewing direction of the user enables to determine enables to track a viewing direction of the user. Additionally, modifying the alpha value of one or more pixels of the second color channel based on the gaze duration enables to determine time durations that the user has focused at a specific region within the virtual environment. Such ability to track the viewing direction and time durations that the user has focused can be employed, for example to determine an affinity of the user towards specific products within an environment and thereby, present the product more effectively to the user. Additionally, such affinity of the user can be used to direct marketing and/or advertising campaigns associated with the product towards the user. Such techniques enable to provide a favorable experience to the user by presenting them with products and/or services that they are more likely to purchase and furthermore, enables to provide increased sales of products for companies associated therewith. Also, generating the at least one second image based on the modified alpha value of the one or more pixels of the second color channel enables one or more persons (such as market research professionals, store owners, product manufacturers, advertisers and so forth) to easily comprehend an affinity of the user towards a specific product and/or service presented within a virtual environment. Therefore, the at least one second image enables the persons to design marketing and/or advertising campaigns with better targeting and/or having higher effectiveness as compared to conventional techniques of designing marketing and/or advertising campaigns, thereby providing higher return on investment (ROI) for the campaigns.

DETAILED DESCRIPTION OF THE DRAWINGS

Referring to FIG. 1, shown is a block diagram of a system 100 for determining a region of interest of a user in a virtual environment, in accordance with an embodiment of the present disclosure. The system 100 comprises a head mounted device 110, a computing device 120, and a server arrangement 130. As shown, the computing device 120 is communicably coupled to the head mounted device 110. For example, the system 100 includes a network 140 that is operable to communicably couple the computing device 120 with the server arrangement 130.

FIG. 1 is merely an example, which should not unduly limit the scope of the claims herein. A person skilled in the art will recognize many variations, alternatives, and modifications of embodiments of the present disclosure.

Figure 2:
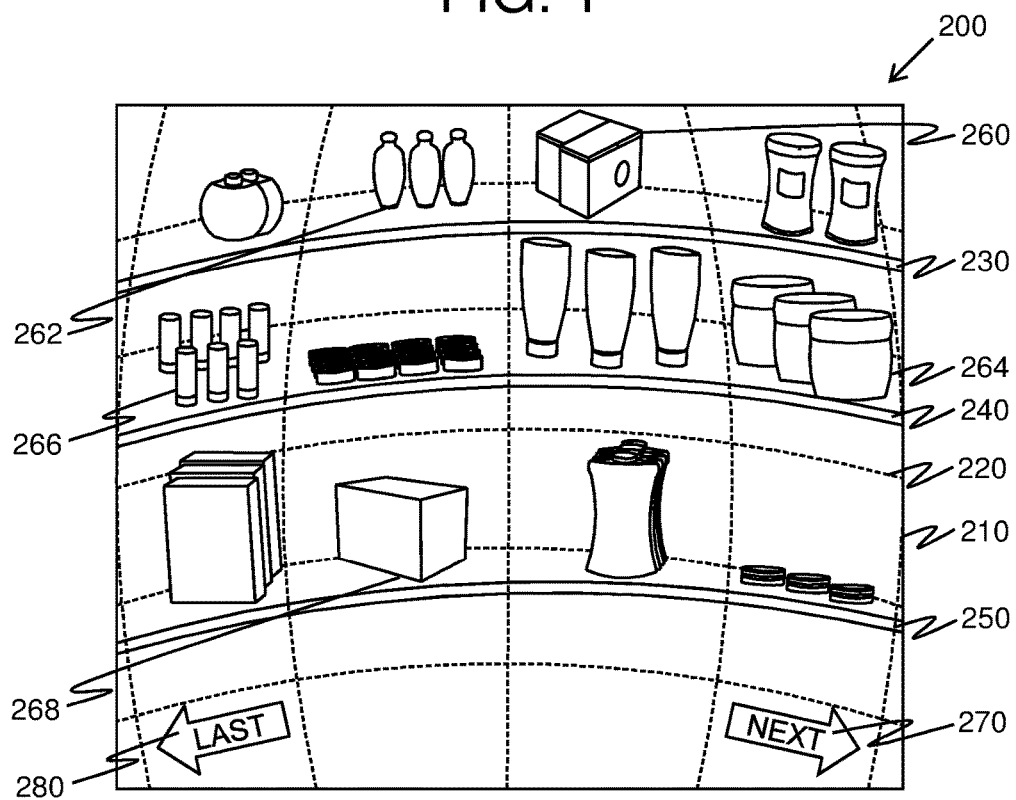
FIG. 2 is a schematic illustration of an exemplary virtual environment, in accordance with an embodiment of the present disclosure.

Referring to FIG. 2, shown is a schematic illustration of an exemplary virtual environment 200, in accordance with an embodiment of the present disclosure. As shown the exemplary virtual environment 200 comprises an image 210 (such as the at least one first image) associated with the virtual environment 200 on a virtual pattern, such as a virtual sphere 220. Moreover, the image 210 is presented on a display of a head mounted device, such as the head mounted device 110 of FIG. 1. For example, the image 210 depicts a retail establishment. As shown, the retail establishment depicts a first shelf 230, a second shelf 240 and a third shelf 250. Furthermore, a plurality of items 260-268 is arranged on the shelves 230-250. As shown, the items 260 and 262 are arranged on the first shelf 230, the items 264 and 266 are arranged on the second shelf 240, and the items 268 are arranged on the third shelf 250. Furthermore, the items 260-268 may be any consumer product available in a regular departmental store. For example, the item 260 may be a 'washing soda container'; the item 262 may be a 'perfume bottle'; the item 264 may be a 'jam jar'; the item 266 may be a 'toothpaste tube'; and the item 268 may be a 'cardboard box'. Moreover the image 210 may include graphical elements 270 and 280 that enable the user to interact with the virtual environment 200. For example, the graphical element 270 enables the user to navigate to a 'next' virtual environment 200 (such as a next aisle within the retail establishment) and the graphical element 280 enables the user to navigate to a 'last' virtual environment 200 (such as a last aisle presented to the user within the virtual environment).

FIG. 2 is merely an example, which should not unduly limit the scope of the claims herein. A person skilled in the art will recognize many variations, alternatives, and modifications of embodiments of the present disclosure.

Figure 3:
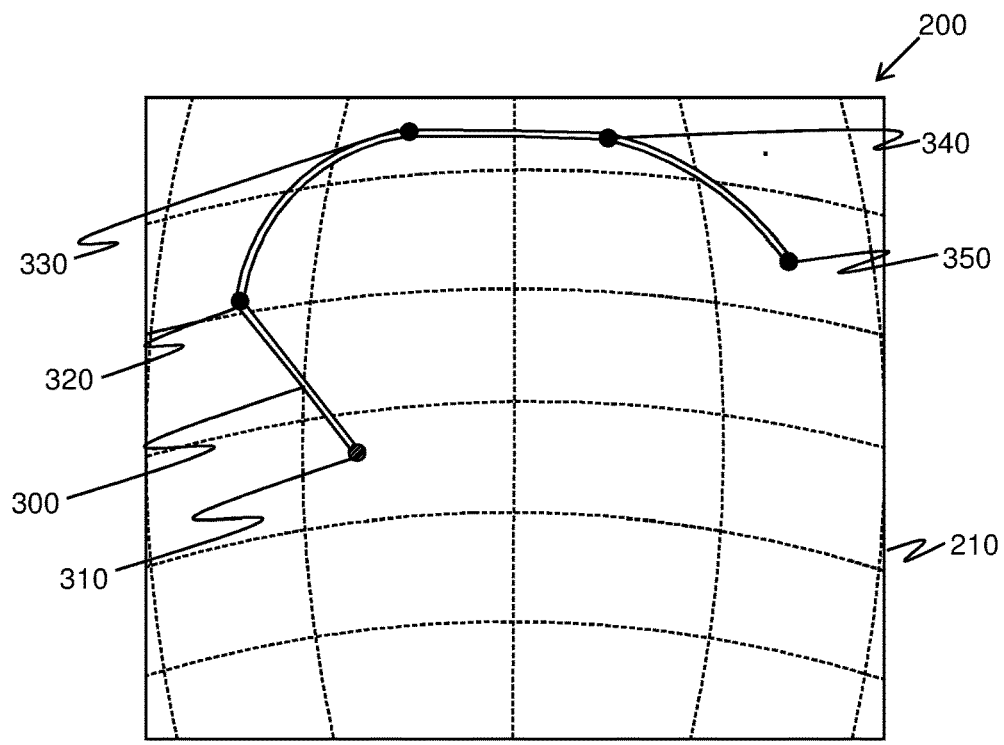
FIG. 3 is a schematic illustration of a change in viewing direction of the user associated the exemplary virtual environment, in accordance with an embodiment of the present disclosure.

Referring to FIG. 3, shown is a schematic illustration of a change in viewing direction 300 of the user associated the exemplary virtual environment 200 of FIG. 2, in accordance with an embodiment of the present disclosure. As shown the change in viewing direction 300 of the user includes various sets of pixels 310-350. Moreover, the sets of pixels 310-350 are regions wherein the user pauses while viewing different items (such as the items 260-268 of FIG. 2). Furthermore, the sets of pixels 310-350 are shown to be associated with different alpha values based on a duration that the user pauses while viewing the items 260-268. As shown, the alpha value of the set of pixels 350 is greater than that of the set of pixels 340; the alpha value of the set of pixels 340 is greater than that of the set of pixels 330; the alpha value of the set of pixels 330 is greater than that of the set of pixels 320; and the alpha value of the set of pixels 320 is greater than that of the set of pixels 310. Therefore, the in such an instance, the user has paused at the set of pixels 350 for the longest duration.

FIG. 3 is merely an example, which should not unduly limit the scope of the claims herein. A person skilled in the art will recognize many variations, alternatives, and modifications of embodiments of the present disclosure.

Figure 4:
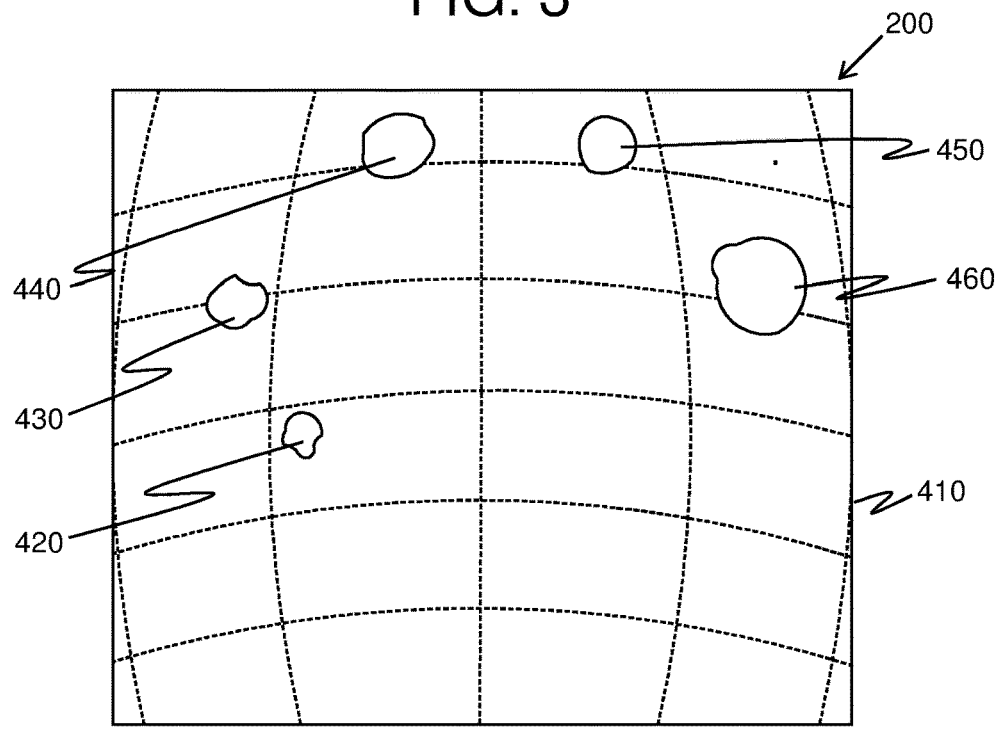
FIG. 4 is a schematic illustration of regions of interest of the user in the exemplary virtual environment, in accordance with an embodiment of the present disclosure.

Referring to FIG. 4, shown is a schematic illustration of regions of interest 420-460 of the user in the exemplary virtual environment 200 of FIG. 2, in accordance with an embodiment of the present disclosure. As shown, the regions of interest 420-460 of the user are associated with an image 410 (such as the at least one second image). The regions of interest 420-460 are shown to have alpha values indicative of an amount of interest of the user in the region of the exemplary virtual environment 200. As shown the alpha value of the region of interest 460 is greater than the region of interest 450; the alpha value of the region of interest 450 is greater than the region of interest 440; the alpha value of the region of interest 440 is greater than the region of interest 430; and the alpha value of the region of interest 430 is greater than the region of interest 420. Therefore, the in such an instance, the users may be interested in an item (such as the item 264) displayed in the region of interest 460.

FIG. 4 is merely an example, which should not unduly limit the scope of the claims herein. A person skilled in the art will recognize many variations, alternatives, and modifications of embodiments of the present disclosure.

Figure 5:
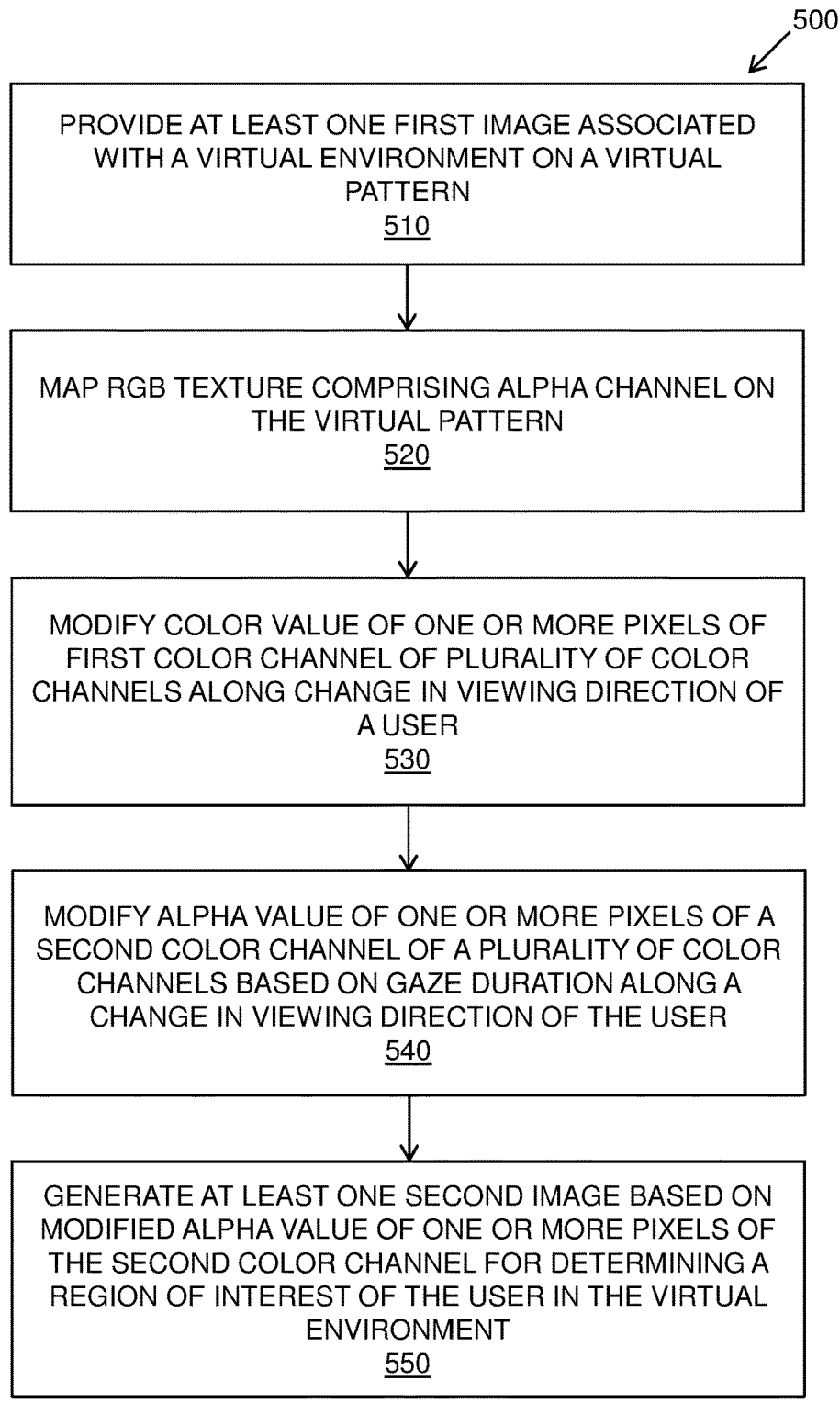
FIG. 5 is an illustration of steps of a method of determining a region of interest of a user in a virtual environment, in accordance with an embodiment of the present disclosure.

Referring to FIG. 5, illustrated are steps of a method 500 of determining a region of interest of a user in a virtual environment, in accordance with an embodiment of the present disclosure. At a step 510 at least one first image is provided, wherein, the at least one first image is associated with the virtual environment on a virtual pattern, such as a virtual sphere. At a step 520, an RGB texture comprising an alpha channel on the virtual sphere is mapped, wherein the RGB texture comprises a plurality of color channels. At a step 530, a color value of one or more pixels of a first color channel of the plurality of color channels along a change in viewing direction of the user is modified. At a step 540, an alpha value of one or more pixels of a second color channel of the plurality of color channels is modified based on a gaze duration along the change in viewing direction of the user. At a step 550, an at least one second image is generated based on the modified alpha value of the one or more pixels of the second color channel for determining the region of interest of the user in the virtual environment.

The steps 510 to 550 are only illustrative and other alternatives can also be provided where one or more steps are added, one or more steps are removed, or one or more steps are provided in a different sequence without departing from the scope of the claims herein. In an example, the modified color value of the one or more pixels of the first color channel is indicative of change of region of interest of the user in the virtual environment; moreover, the modified alpha value of the one or more pixels of the second color channel is indicative of an amount of interest of the user in the region of the virtual environment. In another example, the at least one second image comprises color gradients indicative of amount of interest of the user in the region of the virtual environment. In yet another example, an alpha value of one or more pixels of a third color channel of the plurality of color channels is modified based on the gaze duration along the change in viewing direction of the user. In an example, the change in viewing direction of the user comprises at least one of: a linear movement, a rotational movement. In another example, the alpha value of one or more pixels of the second color channel lies in a range of 0 to 255. In another example, the at least one first image is at least one of: a still image; a video frame of a video associated with the virtual environment. In yet another example, the region of interest of the user in the virtual environment comprises at least one object that enables the user to interact with the virtual environment.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A method of determining a region of interest of a user in a virtual environment, the method comprising:
    (i) providing at least one first image associated with the virtual environment on a virtual pattern;
    (ii) mapping an RGB texture comprising an alpha channel on the virtual pattern; wherein the RGB texture comprises a plurality of color channels;
    (iii) modifying a color value of one or more pixels of a first color channel of the plurality of color channels along a change in viewing direction of the user;
    (iv) modifying an alpha value of one or more pixels of a second color channel of the plurality of color channels based on a gaze duration along the change in viewing direction of the user; and
    (v) generating an at least one second image based on the modified alpha value of the one or more pixels of the second color channel for determining the region of interest of the user in the virtual environment.

2. A method according to claim 1, wherein
the modified color value of the one or more pixels of the first color channel is indicative of change of region of interest of the user in the virtual environment; and
the modified alpha value of the one or more pixels of the second color channel is indicative of an amount of interest of the user in the region of the virtual environment.

3. A method according to claim 1, wherein the at least one second image comprises color gradients indicative of amount of interest of the user in the region of the virtual environment.

4. A method according to claim 1, further comprising modifying an alpha value of one or more pixels of a third color channel of the plurality of color channels based on the gaze duration along the change in viewing direction of the user.

5. A method according to claim 1, wherein the change in viewing direction of the user comprises at least one of: a linear movement, a rotational movement.

6. A method according to claim 1, wherein the alpha value of one or more pixels of the second color channel lies in a range of 0 to 255.

7. A method according to claim 1, wherein the at least one first image is at least one of: a still image; a video frame of a video associated with the virtual environment.

8. A method according to claim 1, wherein the region of interest of the user in the virtual environment comprises at least one object that enables the user to interact with the virtual environment.

9. A system for determining a region of interest of a user in a virtual environment, the system comprising:
a head mounted device to provide at least one first image associated with the virtual environment on a virtual pattern;
a computing device communicably coupled to head mounted device; wherein the computing device is operable to:
map an RGB texture comprising an alpha channel on the virtual pattern, wherein the RGB texture comprises a plurality of color channels;
modify a color value of one or more pixels of a first color channel of the plurality of color channels along a change in viewing direction of the user; and
modify an alpha value of one or more pixels of a second color channel of the plurality of color channels based on a gaze duration along the change in viewing direction of the user;
and
a server arrangement communicably coupled to the computing device, wherein the server arrangement is operable to generate an at least one second image based on the modified alpha value of the one or more pixels of the second color channel for determining the region of interest of the user in the virtual environment.

10. A system according to claim 9, wherein
the modified color value of the one or more pixels of the first color channel is indicative of change of region of interest of the user in the virtual environment; and
the modified alpha value of the one or more pixels of the second color channel is indicative of an amount of interest of the user in the region of the virtual environment.

11. A system according to claim 9, wherein the at least one second image comprises color gradients indicative of amount of interest of the user in the region of the virtual environment.

12. A system according to claim 9, wherein the head mounted device comprises:
a sensor arrangement for sensing the change in viewing direction of the user; and
a transmitter that is operable to transmit the sensed change in viewing direction of the user to the computing device.

13. A system according to claim 12, wherein the sensor arrangement comprises at least one of: an accelerometer, a gyroscope.

14. A system according to claim 9, wherein the change in viewing direction of the user comprises at least one of: a linear movement, a rotational movement.

15. A system according to claim 9, wherein the computing device is further operable to modify an alpha value of one or more pixels of a third color channel of the plurality of color channels based on the gaze duration along the change in viewing direction of the user.

16. A system according to claim 9, wherein the alpha value of one or more pixels of the second color channel lies in a range of 0 to 255.

17. A system according to claim 9, wherein the at least one first image is at least one of: a still image; a video frame of a video associated with the virtual environment.

18. A system according to claim 9, wherein the region of interest of the user in the virtual environment comprises at least one object that enables the user to interact with the virtual environment.

19. A computer program product comprising a non-transitory computer-readable storage medium having computer-readable instructions stored thereon, the computer-readable instructions being executable by a computerized device comprising processing hardware to execute a method according to claim 1.

* * * * *